(12) United States Patent
Kimura et al.

(10) Patent No.: US 6,399,950 B1
(45) Date of Patent: Jun. 4, 2002

(54) TWO-DIMENSIONAL RADIATION DETECTOR

(75) Inventors: Yutaro Kimura, Kyoto; Takayuki Takemoto, Joyo, both of (JP)

(73) Assignee: Shimadzu Corporation, Kyoto (JP)

( * ) Notice: Subject to any disclaimer, the term of this patent is extended or adjusted under 35 U.S.C. 154(b) by 16 days.

(21) Appl. No.: 09/721,637

(22) Filed: Nov. 27, 2000

(51) Int. Cl.[7] .................................................. G01T 1/24
(52) U.S. Cl. .............................. 250/370.09; 250/370.11
(58) Field of Search ......................... 250/370.09, 370.11

(56) References Cited

U.S. PATENT DOCUMENTS

| | | | | |
|---|---|---|---|---|
| 5,313,066 A | * | 5/1994 | Lee et al. | 250/370.09 |
| 5,920,070 A | * | 7/1999 | Petrick et al. | 250/370.09 |
| 6,323,490 B1 | * | 11/2001 | Ikeda et al. | 250/370.07 |

FOREIGN PATENT DOCUMENTS

| | | | | |
|---|---|---|---|---|
| JP | 03235083 A | * | 10/1991 | G01T/1/24 |
| JP | 2000/111651 A | * | 4/2000 | G01T/1/24 |
| JP | 2001/111652 A | * | 4/2000 | G01T/1/24 |

* cited by examiner

Primary Examiner—Constantine Hannaher
(74) Attorney, Agent, or Firm—Kanesaka & Takeuchi

(57) ABSTRACT

In a two-dimensional radiation detector of the invention, a semiconductor layer for converting a radiological image or light image converted therefrom to a picture image of charges by sensing X-ray, and a switching element matrix are integrally formed. A bias electrode common to a signal electrode of the semiconductor layer is connected to a bias power source through a switch or a resistance. An electric current flowing through the bias electrode from the bias power source is detected by a detector, and supplied to a control circuit. The control circuit compares a detected value supplied from the detector with a threshold value, and turns off the switch when the detected current value reaches the threshold value to shut off application of the bias voltage to the bias electrode.

8 Claims, 8 Drawing Sheets

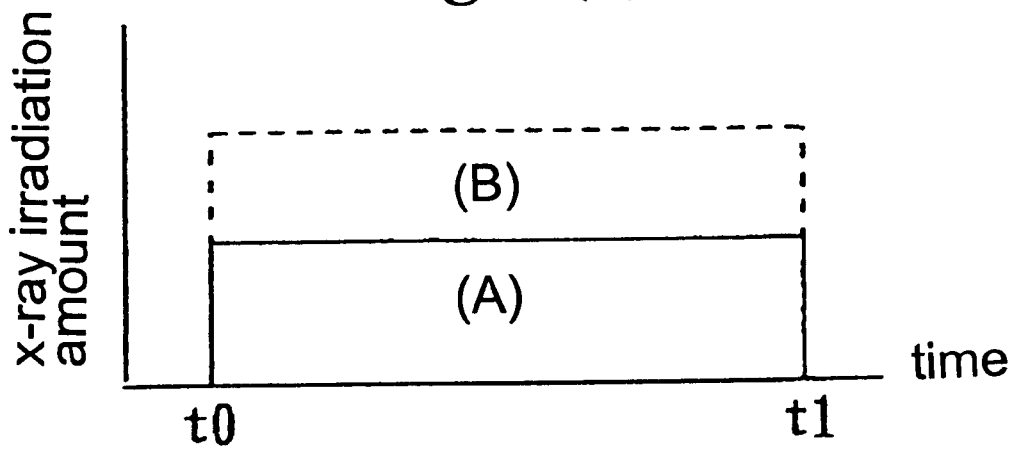
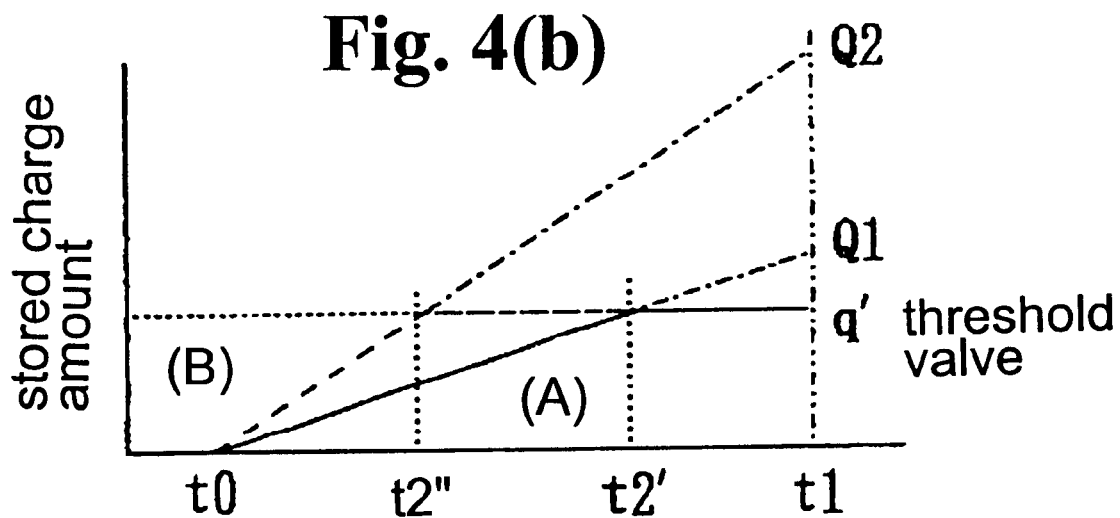

TWO-DIMENSIONAL RADIATION DETECTOR

BACKGROUND OF THE INVENTION AND RELATED ART STATEMENT

The invention relates to a two-dimensional radiation detector for detecting radiation, such as X-ray, of an X-ray image-taking apparatus suitable for medical diagnosis, more particularly, a two-dimensional radiation detector of a solid operation system.

As known by Japanese Patent Publications (KOKAI) No. 4-212456, No. 4-212458 and No. 3-185863, a two-dimensional radiation detector is structured such that a semiconductor layer for sensing radiation, such as X-ray, or light converted from radiation to electric charges, and a switching element matrix formed of field effect transistors or the like are integrated, and switching elements are two-dimensionally scanned to obtain picture image signals. The structure thereof is shown in FIGS. 6 and 7.

In FIG. 6, reference numeral 1 is a semiconductor layer, one side surface of which is provided with a bias electrode 2 to be connected to a bias power source E and the other side surface of which is provided with a signal electrode 3 in a shape of matrix where detection elements, i.e. picture elements, are disposed two-dimensionally. Numeral 4 is a switching element matrix formed of switching elements 5, such as thin film transistors (hereinafter referred to as "TFT"), and the respective switching elements 5 are connected to the respective signal electrodes 3 of the semiconductor layer 1. The semiconductor layer 1 and switching element matrix 4 are produced by a thin film technique. Incidentally, in the drawings, numeral 6 represents condensers for storing charges, which are manufactured by the thin film technique in the same manner as in the semiconductor layer 1 and switching element matrix 5.

With the structure, in case radiation, for example X-ray, transmitted through a subject to be examined, enters the semiconductor layer 1 through the bias electrode 2, the X-ray is absorbed by the semiconductor layer 1 to produce a pair of electron-hole, i.e. charges.

The produced charges are subjected to a voltage shift by a voltage applied to the bias electrode 2 from the bias power source E and the charges are stored in the condenser 6. The charge amount stored in the condenser 6 varies corresponding to an incident X-ray dosage or amount to the semiconductor layer 1.

Switching lines 7 of the switching elements 5 for constituting the switching element matrix 4 are connected to a switching element drive circuit 8, and read-out lines 9 are connected to a multiplexer 11 through respective amplifiers 10, as shown in an equivalent circuit of FIG. 7. When the switching elements 5 are driven by the switching element drive circuit 8, the charges stored in the condensers 6 of the respective picture elements of one line, the switching elements 5 of which are turned on, are simultaneously outputted to the read-out lines 9. When the switching element drive circuit 8 sequentially drives the switching elements 5, the picture elements are two-dimensionally scanned and signals outputted to the read-out lines 9 are converted to picture image signals for the respective picture elements at the multiplexer 11 to be inputted to an A/D converter 12. Digital picture image signals of the respective picture elements are obtained at the A/D converter 12, and a two-dimensional X-ray picture image can be obtained by processing the digital picture image signals.

However, in the conventional two-dimensional radiation detector, there are problems as described below.

In case a large amount of radiation, such as X-ray, enters the semiconductor layer, a voltage applied to the condenser by charging of a stored charge is increased. The increase in the voltage applied to the condenser causes restriction of a dynamic range by saturation of the storage amount and a withstand voltage break of the switching element connected to the condenser.

In view of the above problems, an object of the invention is to provide a two-dimensional radiation detector, wherein in case a large amount of radiation exceeding a predetermined value enters any of detection elements, i.e. picture elements, a bias voltage to be applied to a bias electrode of a semiconductor layer is shut off to restrict a pair of electron-hole, i.e charges, produced in the semiconductor layer, a restriction of a dynamic range due to saturation of the storage amount of a condenser is removed, and a withstand voltage break of a switching element due to increase in a voltage applied to the condenser does not occur.

Another object of the invention is to provide a two-dimensional radiation detector having a wide dynamic range as stated above, wherein a picture image signal having an amount corresponding to an incident radiation or X-ray amount can be obtained.

A further object of the invention is to provide a two-dimensional radiation detector, wherein a pair of electron-hole, i.e. charges, produced in the semiconductor layer by incidence of radiation, is automatically restricted correspondingly to an incident radiation amount to remove a restriction of a dynamic range by saturation of a storage amount due to increase in a voltage applied to a condenser, and a switching element connected to the condenser is not subjected to a withstand voltage break.

Further objects and advantages of the invention will be apparent from the following description of the invention.

SUMMARY OF THE INVENTION

In order to attain the above objects, according to a first aspect of the invention, a two-dimensional radiation detector includes a current detecting device for connecting a bias electrode of a semiconductor layer to a bias power source through a switch and detecting a current flowing through a circuit where the switch is interposed; and a control circuit for turning off the switch when a current value detected by the current detecting device reaches a threshold value.

According to a second aspect of the invention, the two-dimensional radiation detector of the first aspect of the invention further includes a compensation device for compensating an output signal q of each detection element, i.e picture element, at a switch-off time t2 to obtain a compensation signal Q according to the following equation:

$$Q=(t1-t0)/(t2-t0)*q$$

wherein to is a radiation start time; t1 is a radiation terminate time; t2 is a time when the switch is turned off in the control circuit; and q is an output signal of each picture element at the switch-off time t2.

With the structure, in the two-dimensional radiation detector according to the first aspect of the invention, when radiation, such as X-ray, enters the semiconductor layer, an electric current flows through the bias electrode of the semiconductor layer from a bias power source. The electric current flowing through the bias electrode is detected by the current detecting device to be provided to the control circuit. The control circuit compares the current value detected at the current detecting device and a predetermined threshold value, and when the detected current value exceeds the threshold value, the control circuit turns off the switch interposed between the bias electrode of the semiconductor layer and the bias power source.

Incidentally, the threshold value is set to a current value where the storage amount of the condenser is not saturated due to increase in a voltage applied to the condenser, and a switching element connected to the condenser is not subjected to a withstand voltage break.

Therefore, when a large amount of X-ray enters any of the detection elements, i.e. picture elements, of the semiconductor layer constituting the two-dimensional radiation detector and the current flowing through the bias electrode of the semiconductor layer through the switch from the bias power source reaches the threshold value, since the switch interposed between the bias electrode and the bias power source is turned off and application of the bias voltage to the bias electrode is shut off, increase in the voltage of the condenser is suppressed to thereby prevent the storage amount from being saturated and, at the same time, a withstand voltage break of the switching element connected to the condenser is prevented.

Also, in the two-dimensional radiation detector according to the second aspect of the invention, in case a large amount of X-ray enters any of the detection elements, i.e. picture elements, of the semiconductor layer constituting the two-dimensional radiation detector and the switch interposed between the bias electrode and the bias power source is turned off, based on an output signal of each detection element, i.e. picture element, by the charge amount stored in the condenser during a period from an X-ray irradiation start time t0 to a switch-off time t2 when application of the bias voltage to the bias electrode is shut off, since a charge amount from the X-ray irradiation start time t0 to an X-ray irradiation terminate time t1 is compensated, a picture image signal having an amount corresponding to an incident X-ray amount can be obtained. Thus, there can be obtained the two-dimensional radiation detector having a wide dynamic range wherein the storage amount of the condenser is not saturated, and the switching element connected to the condenser is not subjected to the withstand voltage break.

According to a third aspect of the invention, a two-dimensional radiation detector is structured such that a bias electrode of a semiconductor layer is connected to a bias power source through an impedance element.

According to a fourth aspect of the invention, in the two-dimensional radiation detector of the third aspect of the invention, an electric current or voltage flowing through the impedance element of the impedance element is detected, and a signal read out from each element is compensated based on the detected signal.

With the structure, in the two-dimensional radiation detector of the third aspect of the invention, when radiation, for example, X-ray, enters the semiconductor layer, an electric current flows to the bias electrode of the semiconductor layer from the bias power source through the impedance element. Since the current flowing through the impedance element varies corresponding to an incident X-ray amount, the voltage applied to the bias electrode of the semiconductor layer varies according to the incident X-ray amount. In other words, as the incident X-ray amount becomes larger, a voltage dropping by the impedance element becomes larger, and the voltage to be applied to the bias electrode of the semiconductor layer is lowered by the portion of the dropped voltage.

Therefore, in case a large amount of X-ray enters the semiconductor layer, the voltage applied to the bias electrode of the semiconductor layer is lowered, an electric field in the semiconductor layer is relaxed, and the electron and hole produced through the X-ray incidence are recombined before they reach a signal electrode of the semiconductor layer to increase a rate of annihilating. Therefore, the charges stored in the condenser is suppressed, and the suppression is made corresponding to the incident X-ray amount to the semiconductor layer. Thus, there can be obtained a two-dimensional radiation detector having a wide dynamic range, wherein increase in the voltage of the condenser is suppressed to thereby prevent the storage amount of the condenser from being saturated, and the switching element connected to the condenser is prevented from being subjected to a withstand voltage break.

In the two-dimensional radiation detector of the fourth aspect of the invention, since the storage charge amount suppressed due to falling of the voltage to be applied to the bias electrode of the semiconductor layer is compensated for every picture element, a picture image signal having an amount corresponding to the incident X-ray amount can be obtained and, at the same time, the storage amount of the condenser is prevented from being saturated, and the switching element connected to the condenser is not subjected to the withstand voltage break. Thus, a two-dimensional radiation detector having a wide dynamic range can be obtained.

BRIEF DESCRIPTION OF THE DRAWINGS

FIGS. 4(a) and 4(b) are characteristic drawings for explaining the functions;

DETAILED DESCRIPTION OF PREFERRED EMBODIMENTS

Figure 1:
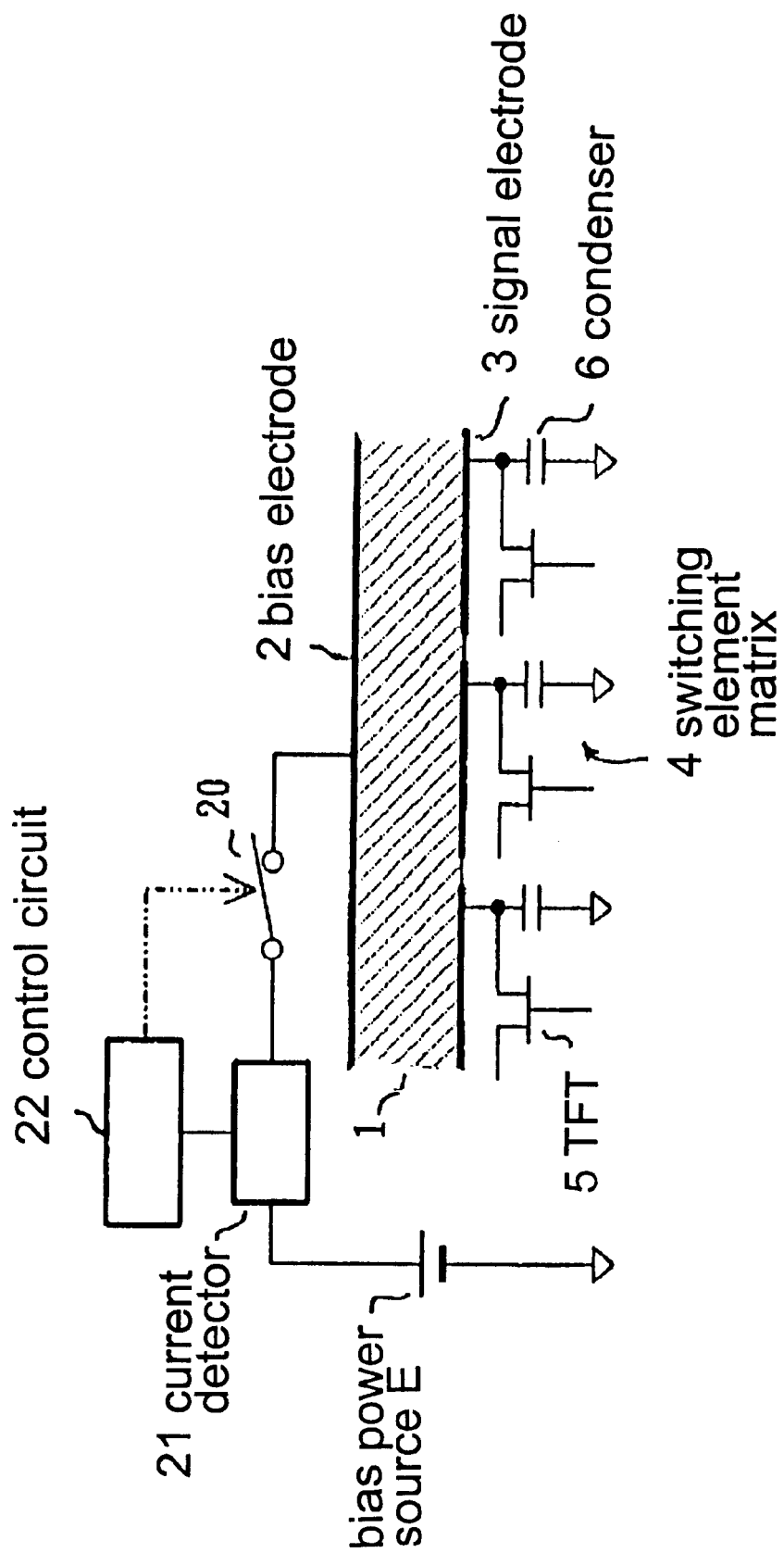
FIG. 1 is a sectional view showing a structure of a two-dimensional radiation detector of an embodiment according to the invention.
Figure 6:
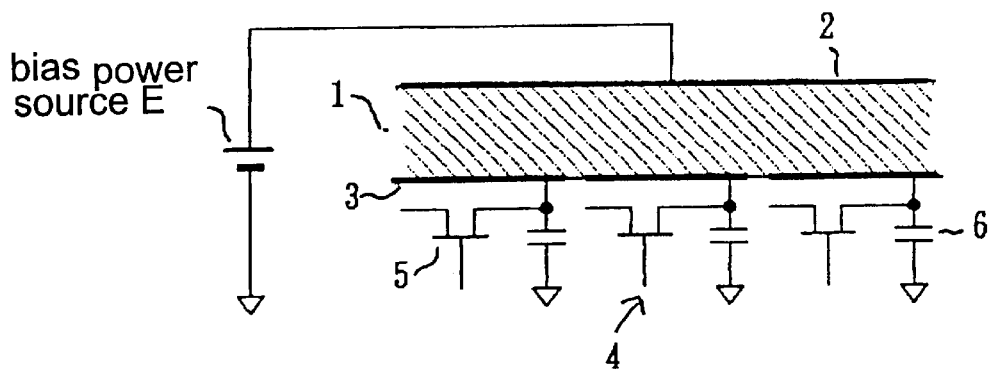
FIG. 6 is a sectional view showing a structure of a conventional two-dimensional radiation detector.

With reference to the accompanying drawings, embodiments according to the invention are explained hereunder. FIG. 1 is a sectional view showing a structure of a two-dimensional radiation detector of a first embodiment according to the invention. The constitutional elements having the same functions as those shown in FIG. 6 are represented by the same symbols and their explanations are omitted.

In FIG. 1, reference numeral 20 represents a switch, and numeral 21 is a current detector connected between a bias power source E and a bias electrode 2 of a semiconductor layer 1. Numeral 22 is a control circuit for comparing a threshold value set at a current value where saturation of storage charges by increase in a voltage applied to a condenser 6 does not occur and a withstand voltage break of a switching element 5 connected to the condenser 6 does not occur, and a detected current value from the current detector 21, and when the detected current value reaches the threshold value, the switch 20 is turned off.

Figure 2B:
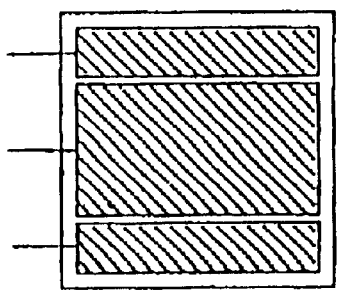
FIGS. 2(a) to 2(d) are diagrams showing variations of bias electrodes according to the invention.
Figure 2D:
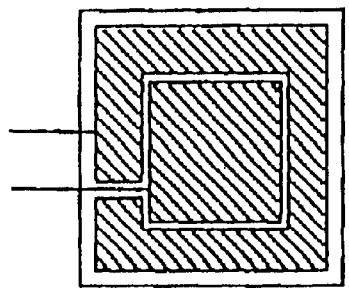
Figure 2A:
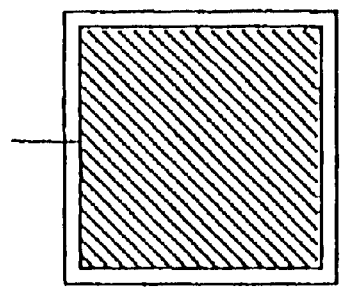
Figure 2C:
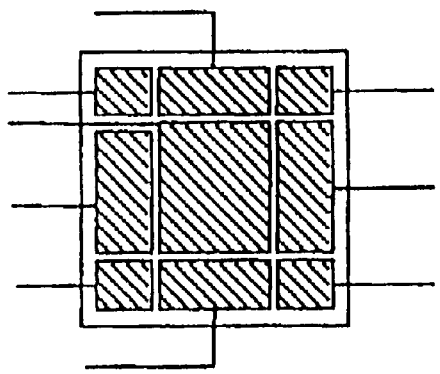
Figure 3:
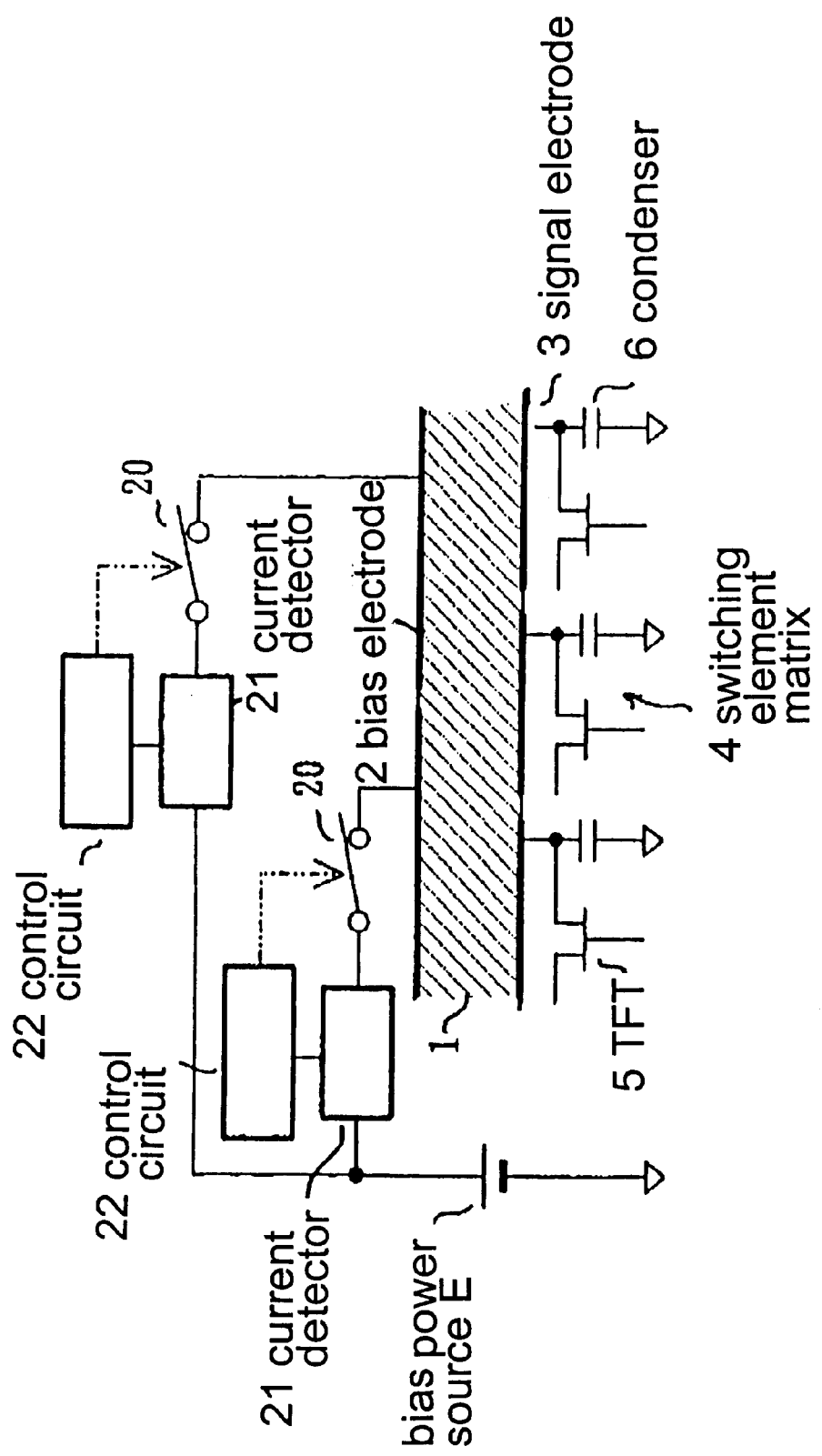
FIG. 3 is a sectional view showing a structure of a two-dimensional radiation detector of another embodiment according to the invention.

Incidentally, while a signal electrode 3 is required to be divided in a matrix shape so that detection elements, i.e. picture elements, are arranged two-dimensionally, the bias electrode 2, as shown in FIG. 2(a), may be formed throughout the surface of the semiconductor layer, and may be a single electrode common to all the signal electrodes, not shown. As shown in FIGS. 2(b), 2(c) and 2(d), the bias electrode 2 may be divided into plural electrodes and each of the divided electrodes is common to only a group of the signal electrodes covered by the divided bias electrode. FIG. 2(b) shows a three-division bias electrode divided into three portions laterally; FIG. 2(c) shows nine-division bias electrode divided two-dimensionally into three portions, respectively; and FIG. 2(d) shows a two-division bias electrode divided into a central portion and a peripheral portion. Also, in case the bias electrode is divided to form a plural-division bias electrode, as shown in FIG. 3, each of the divided bias electrodes is connected to the bias power source E through a series circuit of the switch 20 and current detector 21 and, at the same time, there is provided the control circuit 22 for turning off the switch 20 when a detected current value reaches the threshold value.

Next, operations of the two-dimensional radiation detector having the structure as shown in FIG. 1 are explained.

In FIG. 1, when radiation, for example, X-ray, enters from the upper portion, the incident X-ray is absorbed by the semiconductor layer 1 to produce a pair of an electron-hole, i. e. charges, the produced charges cause a charge shift by an electric field formed by a voltage applied to the bias electrode 2 of the semiconductor layer 1, and the charges are stored in the condenser 6 to increase a voltage thereof.

In regard to read-out of a charge signal stored in the condenser 6, through sequential drivings of the switching elements 5 of the switching element matrix 4, the charges stored in the condensers 6 of the respective detection elements, i.e. picture elements, for the respective lines are read out to the respective read-out lines, inputted into the multiplexers through amplifiers 10, and converted into digital image signals for the respective picture elements by an analog-to-digital (hereinafter referred to as "A/D") converter. The operations described above are the same as those explained in the prior art.

Incidentally, although a positive voltage or a negative voltage is applied to the semiconductor layer, i.e. bias electrode, in case the applied voltage is low and an inner electric field of the semiconductor layer is small, the produced electron and hole are recombined before they reach the electrode to thereby annihilate not to be stored in the condenser as the charges. Thus, the voltage to be applied to the bias electrode of the semiconductor layer should be a voltage, by which a sufficient electric field can be obtained and which can be calculated from a product of a moving degree and a life time of the respective electron and hole, so that it is not annihilated through the recombination of the electron and hole before they reach the electrode.

Returning to FIG. 1, when a pair of the electron-hole, i.e charges, is produced in the semiconductor layer 1 through incidence of the X-ray, the hole is drawn to the signal electrode 3 on the cathode side to thereby store the charges in the condenser 6 connected thereto. On the other hand, the electron is drawn to the bias electrode 2 on the anode side and current flows through the switch 20, which is normally in the on-state, from the bias power source E. The current is detected by the current detector 21, and the detected current value or detected current value signal is provided to the control circuit 22 where the detected current value signal and the threshold value are compared.

When a large amount of X-ray enters any of the detection elements, i.e. picture elements, of the semiconductor layer, a large amount of electron-hole pairs, i.e. charges, is produced, the current of the circuit including the switch 20 becomes large, and the detected current value signal reaches the threshold value, so that the switch 20 is turned off by the control circuit 22 to shut off the bias voltage to be applied to the bias electrode 2. When the application of the bias voltage is stopped, since the pair of electron-hole is annihilated through the recombination before they reach the electrode, the charge is not stored in the condenser 6 to thereby prevent the condenser from being saturated and a voltage to be applied to the condenser from being increased, so that the two-dimensional radiation detector not causing the withstand voltage break of the switching element can be obtained.

In the two-dimensional radiation detector shown in FIG. 1, when a large amount of X-ray enters any of the detection elements, i.e. picture elements, and the detection current value signal reaches the threshold value, the switch 20 is turned off and the application of the bias voltage to the semiconductor layer 1 is shut off. Thus, in case the detection current value signal of any of the detection elements, i.e. picture elements, exceeds the threshold value, a picture image signal corresponding to the incident X-ray amount can not be obtained and an X-ray intensity can not be evaluated.

In other words, if the condensers connected to the semiconductor layer have a sufficient capacity, when the amount of X-ray as shown by (A) and (B) in FIG. 4(a) enters the semiconductor layer, the charge quantities stored in the condenser are increased with time as shown by characteristics (A) and (B) shown in FIG. 4(b). At an X-ray irradiation terminate time t1, a charge amount Q1 with respect to the amount (A) and a charge amount Q2 with respect to the amount (B) are stored in the condensers, and the stored charge quantities Q1 and Q2 correspond to the incident X-ray amounts from an X-ray irradiation start time t0 to an X-ray irradiation terminate time t1.

However, in the two-dimensional radiation detector shown in FIG. 1, in case a large amount of X-ray enters any of the detection elements, i.e. picture elements, and the detected current value signal reaches the threshold value, the switch 20 is turned off at the time t2 to thereby shut off the application of the bias voltage to the bias electrode of the semiconductor layer. Although the switch-off time t2 is different depending on the incident X-ray amount, i.e t2' with the amount (A) and t2" with the amount (B), the charge amounts stored in the condensers of the picture elements which have reached the respective threshold values become a charge amount q' corresponding to the threshold value from the X-ray irradiation start time t0 to the switch-off time t2, regardless of the incident X-ray amounts. Also, the charge amounts stored in the condensers of the picture elements other than the picture elements which have reached the threshold value become the charge amounts corresponding to the incident X-ray amounts from the X-ray irradiation start time t0 to the switch-off time t2, which are less than the charge amounts q' corresponding to the threshold value, so that the picture element which has reached the threshold value and the picture elements other than those do not have the stored charge amounts corresponding to the incident X-ray amounts from the X-ray irradiation start time t0 to the X-ray irradiation terminate time t1.

As apparent from FIGS. 4(a) and 4(b), even if a large amount of X-ray enters, since the time t2 when the switch is turned off according to the incident X-ray amount is different and the charge amount stored in the condenser is in proportion to an irradiated time of X-ray, the charge amount Q stored in the condenser corresponding to the incident X-ray amount from the X-ray irradiation start time t0 to the X-ray irradiation terminate time t1 can be obtained and the picture image signal corresponding to the incident X-ray amount can be obtained by compensating through the following equation:

$$Q=(t1-t0)/(t2-t0)*q$$

wherein, the charge amount q stored in the condenser of each picture element from the X-ray irradiation start time t0 to the switch-off time t2 (a charge amount of the picture element exceeding the threshold value is the charge amount q' corresponding to the threshold value, and a charge amount of the picture element other than that is less than the charge amount q' corresponding to the incident X-ray amount from the X-ray irradiation start time t0 to the switch-off time t2 of each picture element); an X-ray irradiation start time t0; an X-ray irradiation terminate time t1; and the time t2 when the switch is turned off, are used as parameters.

Figure 5:
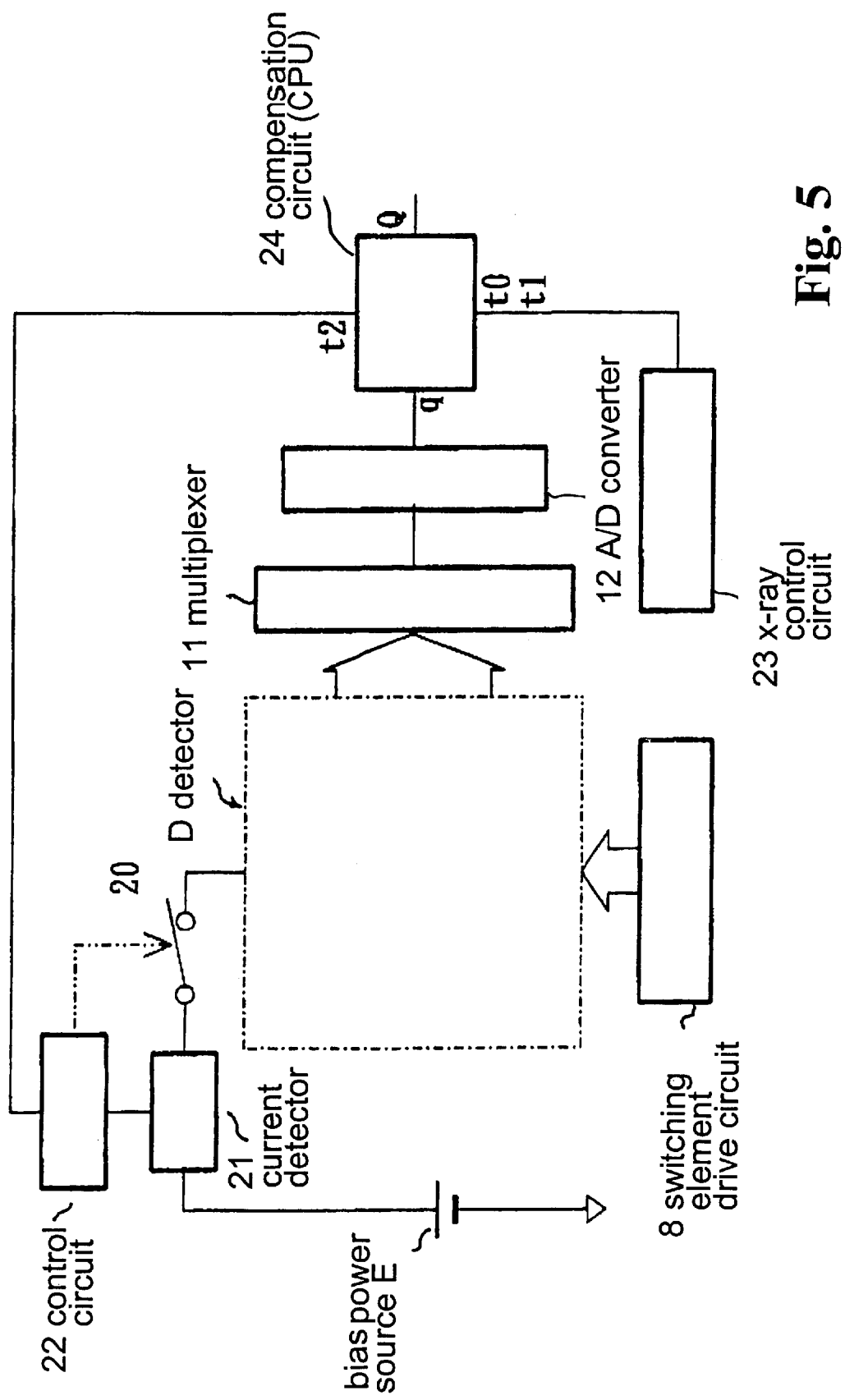
FIG. 5 is a block diagram of a two-dimensional radiation detector of a further embodiment according to the invention.
Figure 7:
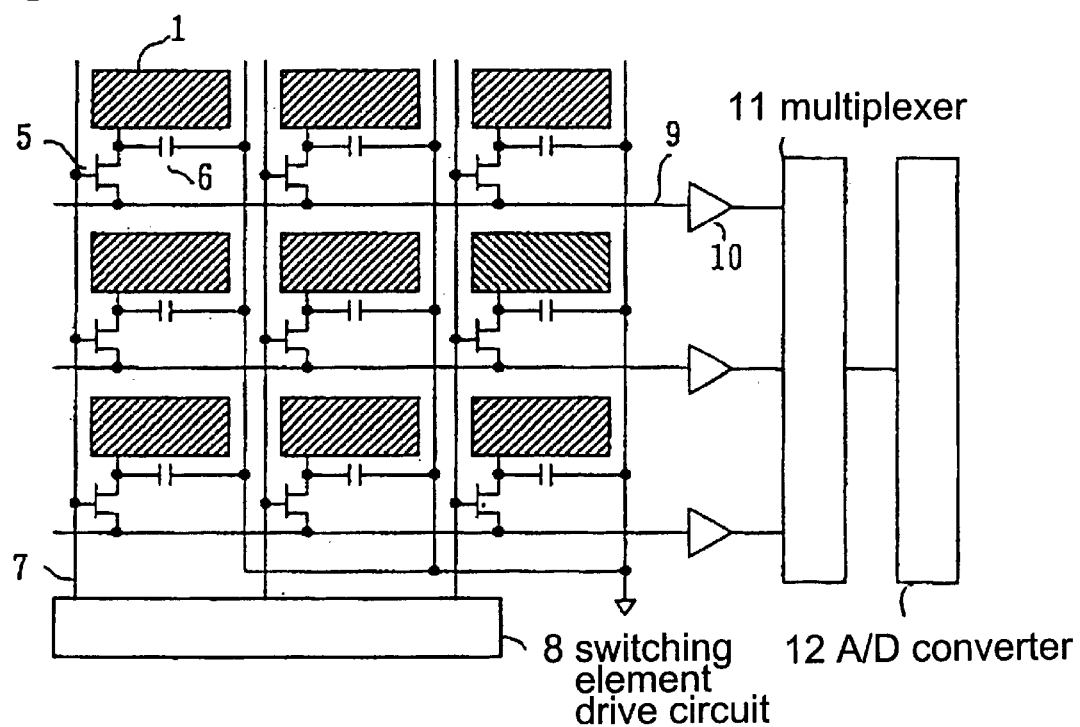
FIG. 7 is an equivalent circuit diagram of FIG. 6.

With a structure shown in FIG. 5, the data obtained by the two-dimensional radiation detector shown in FIG. 1 are compensated by the above-stated equation to thereby obtain a picture image signal corresponding to the incident X-ray amount. The constitutional elements having the same functions as those shown in FIGS. 1 and 7 are represented by the same symbols, and their explanations are omitted.

In FIG. 5, D represents a two-dimensional radiation detector having the same structure as that in FIG. 1; numeral 23 denotes an X-ray control circuit for turning X-ray irradiation on and off; and numeral 24 is a compensation circuit formed of a central processing unit (hereinafter referred to as CPU). The compensation circuit 24 operates $Q=(t1-t0)/(t2-t0)*q$ by receiving an output signal q corresponding to the charge amount stored in the condenser of each picture element read out from the detector D; a switch-off time signal t2 measured by the compensation circuit 24 with the switch-off signal from the control circuit 22; and an X-ray irradiation start time signal to and an X-ray irradiation termination time signal t1 from the X-ray control circuit 23, to thereby obtain a picture image signal Q corresponding to the compensated incident X-ray amount.

With the above-stated structure, when X-ray is irradiated at time t0, X-ray penetrated through a subject to be examined penetrates through the bias electrode and enters the semiconductor layer to be absorbed therein and to produce a pair of electron-hole, i.e. charges, corresponding to the penetrated X-ray amount for every picture element. The produced charges are shifted by an electric field produced by a voltage applied to the bias electrode from the bias power source E, and the charges corresponding to the x-ray amount penetrated until the time t1 when the X-ray irradiation is completed are stored in the condenser of every picture element.

The charge signals stored in the condensers are simultaneously read out line by line when the switching element drive circuit 8 sequentially drives the switching elements of the switching element matrix; the charge signals are inputted into the multiplexer 11 through the respective read-out lines, where the charge signals are converted to a charge signal for each picture element; respectively; and the charge signals are supplied to the compensation circuit 24 through an A/D converter 12 to output a digital picture image signal for each picture element therefrom.

In case a large amount of X-ray exceeding the threshold value does not enter any of the picture elements in the detector D during the X-ray irradiation, since the control circuit 22 does not operate, the compensation circuit 24 does not carry out compensation and outputs a digital picture image signal corresponding to the charge amount stored in the condenser of each picture element from the X-ray irradiation start time t0 to the X-ray irradiation terminate time t1. In case a large amount of X-ray exceeding the threshold value enters any of the picture elements in the detector D, the current value signal detected by the' current detector 21 exceeds the threshold value, the control circuit 22 turns off the switch 20 and a switch-off signal is provided to the compensation circuit 24.

The CPU 24 measures a switch-off time t2 from the switch-off signal. With the switch-off time t2; the digital picture image signal q, from the A/D converter 12, corresponding to the charge stored in the condenser of each picture element from the X-ray irradiation start time t0 to the switch-off time t2; and the X-ray irradiation start time signal to and the X-ray irradiation terminate time signal t1 from the X-ray control circuit 23, the CPU 24 operates $Q=(t1-t0)/(t2-t0)*q$, and outputs the digital picture image signal Q corresponding to the incident X-ray amount during a period from the compensated X-ray irradiation start time t0 to the compensated X-ray irradiation terminate time t1. Incidentally, the output digital picture image signal Q from the compensation circuit 24 is processed at a picture image process circuit (not shown) to obtain two-dimensional X-ray picture images.

Next, an example of a method for manufacturing the two-dimensional radiation detector having the structure as shown in FIG. 1 is explained.

Switching elements are provided on an insulating base plate, such as glass, in a matrix shape by a thin film technique. Thus, the switching elements having TFT and MIM structures divided for respective elements or a double-diode structure, a signal electrode connected to the switching elements, driving lines for driving the switching elements (for example, in a row direction), and read-out lines for flowing charges through the switching elements, i.e. data lines (for example, in a line direction) are formed. Generally, the switching elements are made of amorphous silicon or polysilicon; as an insulating substance, a chemical material, such as a nitride film, oxide film and polyimide, is used; and as a metal material, there are used various materials, such as titanium, aluminum, chrome, tantalum and copper.

A semiconductor layer is provided to cover the entire signal electrode in the matrix shape. The semiconductor layer can be produced by making a film through deposition of chalcogenide-series material, such as selenium, or through chemical vapor deposition (hereinafter referred to as "CVD") of silicon or a cadmium telluride alloy. In addition to those, lead iodide and thallium bromide can be used.

Also, as the thickness of the semiconductor layer is larger, the semiconductor layer absorbs a larger amount of X-ray. In case the semiconductor layer is made of silicon with a low density, selenium, or cadmium telluride alloy, its thickness is 1 to 5 mm, 300 to 1,000 $\mu$m, or 100 to 300 $\mu$m, respectively. Incidentally, the semiconductor layer may be a continuous layer for covering the entire signal electrode in a shape of matrix, or may be a combined layer divided into plural matrices.

Further, a bias electrode is provided over the semiconductor layer. As a material of the bias electrode, in case the incident ray is light, an indium tin oxide alloy (hereinafter referred to as ITO) is mainly used. In case the incident ray is X-ray, since the permeability is high, metal layers or alloy layers of various thin films, such as a gold film, may be used.

Also, the bias electrode may be a bias electrode which covers the entire surface of the semiconductor layer as shown in FIG. 2(a), or division bias electrodes which are divided into more than two as shown in FIGS. 2(b), 2(c), 2(d). Each bias electrode, as shown in FIG. 3, is connected to the bias power source E through a series circuit formed of the switch 20 and the current detector 21, and at the same time, is provided with a control circuit 22 wherein when the detected current value reaches the threshold value, the switch 20 is turned off.

In the above embodiment, the switch-off time t2 is measured at the compensation circuit (CPU). However, in case the control circuit, which compares the current value detected at the current detection circuit and the threshold value to turn off the switch, has a measuring function, the switch-off time may be measured by the control circuit and the switch-off time signal t2 may be supplied to the compensation circuit.

Further, in the above embodiment, the compensation circuit functions as the CPU, and compensation is made by a digital operation. However, an amplifier to be connected to the read-out line of the detector D, or a single amplifier may be provided at a latter part of the D/A converter for converting the digital picture image signal of the detector D to analogue picture image signal, and a gain of the amplifier may be varied to compensate. In this case, the gain of the amplifier can be varied based on $Q=(t1-t0)/(t2-t0)*q$.

In case the bias electrode is a division bias electrode divided into more than two, a switch, current detector and control circuit for control the switch based on an output signal from the current detector are provided to each divided bias electrode, and at the same time, a compensation circuit is provided. Thus, radiation picture images having better quality can be obtained.

Figure 8:
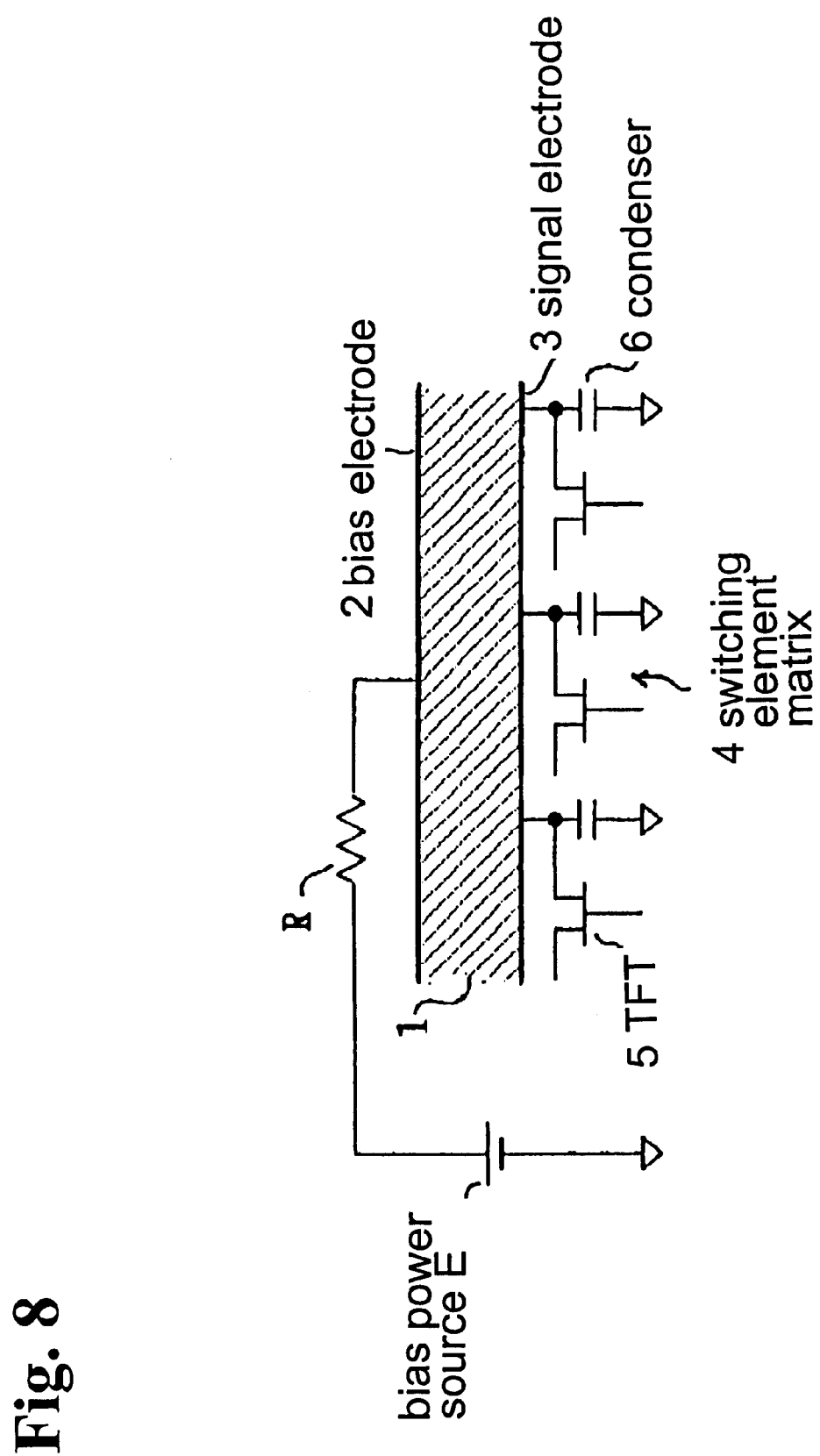
FIG. 8 is a sectional view of a two-dimensional radiation detector of a still further embodiment of the invention.

FIG. 8 is a sectional view of a two-dimensional radiation detector of another embodiment according to the present invention, wherein constitutional elements having the same functions as those in FIG. 7 are represented by the same symbols and explanations thereof are omitted.

In FIG. 8, R represents a resistance, i.e. impedance element, and is connected between a bias power source E and a bias electrode 2 of a semiconductor layer 1.

Incidentally, while a signal electrode 3 requires that detection elements, i.e. picture elements, are divided to form a matrix shape two-dimensionally, the bias electrode 2 may be formed as shown in FIGS. 2(a) to 2(d). Also, in case the bias electrode is divided to form a plural division bias electrode, it is preferable to connect the respective divided bias electrodes to the bias power source E through the resistances.

Next, functions of the resistance R connected between the bias power source E and the bias electrode 2 of the semiconductor layer 1 are explained.

In FIG. 8, the function when radiation, for example, X-ray enters from an upper portion, and the necessary bias electrode are the same as those of the embodiment shown in FIG. 1.

When a pair of electron-hole, i.e. charges, is produced in the semiconductor layer 1 through incidence of X-ray, charges are stored in the condenser 6 connected to the signal electrode 3 on a cathode side, while current flows to the bias electrode 2 on a anode side from the bias power source E through the resistance R. A voltage drop occurs by the resistance R, and a voltage applied to the bias electrode 2 is lowered by a portion which is lowered by the resistance R to thereby relieve an electric field in the semiconductor layer.

With the relief of the electric field, a ratio at which the electron and the hole in the semiconductor layer are recombined before they reach the electrode on the opposite side is increased, so that the charge stored in the condenser 6 connected to the signal electrode 3 is suppressed. As a result, there can be obtained a two-dimensional radiation detector having a wide dynamic range, wherein saturation of a storage amount in the condenser and increase in the voltage applied to the condenser are prevented, and the switching element is not subjected to a withstand voltage break.

Also, since the current flowing through the resistance R interposed between the bias power source E and the bias electrode 2 becomes larger as the X-ray amount entering the semiconductor layer becomes larger, voltage drop by the resistance R becomes larger by that portion to thereby lower the voltage applied to the bias electrode 2. Thus, saturation of a storage amount of the condenser due to a large amount of X-ray incidence to the semiconductor layer 1 and increase in the voltage applied to the condenser can be positively prevented.

In the two-dimensional radiation detector shown in FIG. 8, the voltage applied to the bias electrode 2 is lowered by the portion which is lowered by the resistance R, and the voltage lowered due to the voltage drop of the resistance R is varied according to the incident X-ray amount to the semiconductor layer. Thus, a picture image signal corresponding to the incident X-ray amount can not be obtained, so that an X-ray intensity can not be evaluated.

Figure 9A:
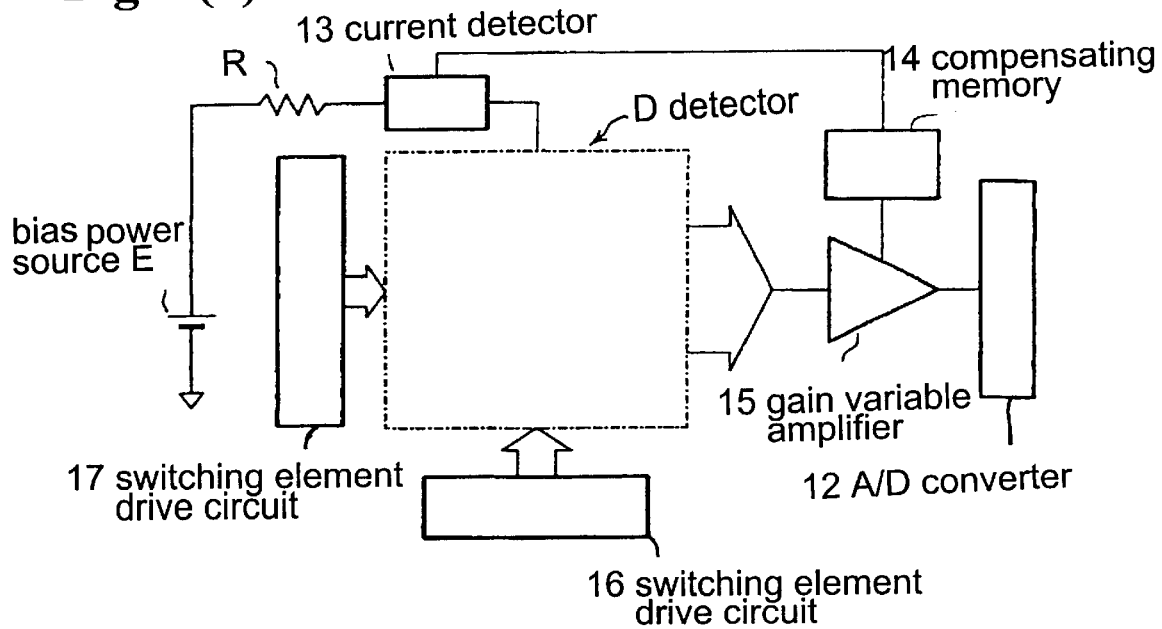
FIGS. 9(a) and 9(b) are block diagrams of two-dimensional radiation detectors of further embodiments according to the invention.
Figure 9B:
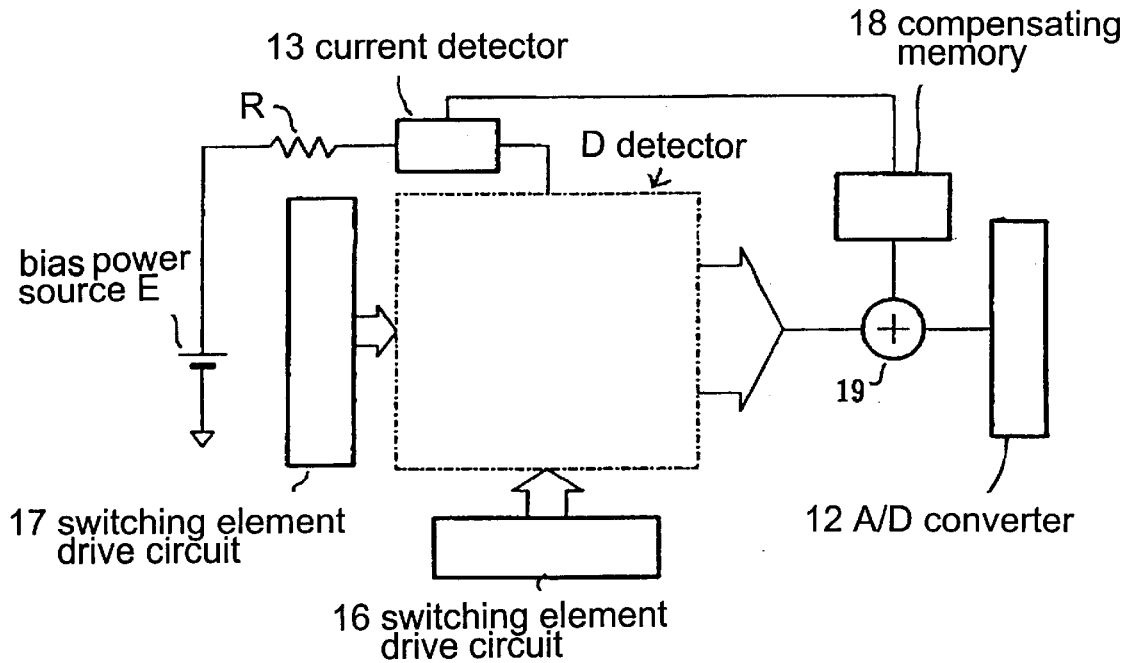

Two-dimensional radiation detectors shown in FIGS. 9(a) and 9(b) are structured such that the data obtained by the two-dimensional radiation detector shown in FIG. 8 are compensated to thereby obtain a picture image signal corresponding to the incident X-ray amount.

In FIG. 9(a), D represents a two-dimensional radiation detector having the structure shown in FIG. 8; numeral 13 is a current detector for detecting the current flowing through the resistance R; numeral 14 is. a compensating memory; and numeral 15 is a gain variable amplifier. The compensating data corresponding to the current flowing through the resistance R are stored in the compensating memory 14.

In the embodiment, the compensating data are the gain data for controlling the gain of the gain variable amplifier 15. The gain data compensate a charge amount suppressed by the dropping of the voltage applied to the bias electrode 2 due to lowering of the voltage of the resistance R to thereby obtain a picture image signal corresponding to the incident X-ray amount, which can be obtained by a phantom or calculation.

With the above-explained structure, when X-ray transmitted through a subject to be examined passes through the bias electrode and enters the semiconductor layer, the X-ray is absorbed in the semiconductor layer to produce a pair of electron-hole, i.e. charges; the produced charge is subjected to a charge shift by an electric field produced by the voltage applied to the bias electrode from the bias power source E; the charge is stored in the condenser; the respective picture elements are two-dimensionally scanned by driving switching elements sequentially through the switching element driving circuits 16, 17 in the X and Y directions to read the charges stored in the condenser for each picture element; and the read-out signal is inputted to the gain variable amplifier 15.

On the other hand, in the gain variable amplifier 15, a gain for every picture element is adjusted by the gain data read out from the compensating memory 14 based on the detected current corresponding to the incident X-ray amount to each picture element of the current detector 13; the read-out signal is amplified by the adjusted gain; and a digital picture image signal for every picture element corresponding to the compensated incident X-ray amount to the semiconductor layer can be obtained from the A/D converter 12. The compensated digital picture image signal from the A/D converter 12 is processed at a picture image process circuit (not shown) to produce two-dimensional X-ray picture images.

The two-dimensional radiation detector having the structure as shown in FIG. 8 can be manufactured in the same manner as described in FIG. 1. In this case, the bias electrode may be a single bias electrode covering the entire surface of the semiconductor layer as shown in FIG. 2(a), or a division bias electrode divided into more than two as shown in FIG. 2(b), 2(c) or 2(d), wherein the respective divided bias electrodes are connected to the bias power source through the respective resistances.

Also, in the embodiment, the current flowing through the resistance is detected, and a charge portion suppressed due to the voltage drop of the resistance is compensated to thereby obtain an image signal corresponding to the incident X-ray amount. However, by detecting the dropped voltage of the resistance, the charge portion suppressed by the dropped voltage of the resistance may be compensated by the detected voltage.

Further, in the embodiment, a compensating device is formed of the compensating memory for storing the compensation gain data and the gain variable amplifier to thereby control the gain of the gain variable amplifier. However, as shown in FIG. 9(b), a compensating device may be formed of a compensating memory 18 for storing a compensating amount corresponding to a storage charge amount suppressed by the dropped voltage of the resistance and an adder 19, wherein a compensating amount is read out from the detected current and/or voltage, and the read-out compensating amount is added to an output signal of the detector D to thereby obtain a picture image signal corresponding to the incident X-ray amount.

Also, in the embodiment, the charge portion suppressed by the dropped voltage of the resistance is compensated at a stage of analogue signal of a previous stage of the A/D converter. However, it is also possible to compensate the suppressed charge portion after it is converted to the digital signal by the A/D converter.

Incidentally, the two-dimensional radiation detectors shown in FIGS. 1 and 8 are direct-conversion-type two-dimensional radiation detectors wherein X-ray is directly converted to the charges in the semiconductor layer. However, the present invention can also be applied to an indirect-conversion-type two-dimensional radiation detector wherein a scintillator, such as CsI, layer is provided on an X-ray incident surface of the semiconductor layer to convert X-ray to light, and the converted light is converted into charges in the semiconductor layer.

According to the two-dimensional radiation detector of the first aspect of the invention, there can be obtained the two-dimensional radiation detector wherein when a large amount of radiation, such as X-ray, enters a semiconductor layer of a detector, since a bias voltage to be applied to a bias electrode of the semiconductor layer is shut off, a condenser is prevented from being saturated and a switching element is prevented from being subjected to a withstand voltage break due to voltage increase in the condenser.

According to the two-dimensional radiation detector of the second aspect of the invention, there can be obtained the two-dimensional radiation detector having a wide dynamic range, wherein when the bias voltage to be applied to the bias electrode of the semiconductor layer is shut off, based on a charge amount stored in the condenser of each detection element, i.e. picture element, of the detector from a radiation irradiation start time to a time when the bias voltage is shut off, compensation is made to the charge amount from the radiation irradiation start time to the radiation irradiation terminate time, so that a picture image signal corresponding to an incident radiation amount can be obtained; the condenser is prevented from being saturated; and a switching element is prevented from being subjected to a withstand voltage break due to a voltage increase of the condenser.

According to the two-dimensional radiation detector of the third aspect of the invention, there can be obtained the two-dimensional radiation detector wherein since a pair of electron-hole (charges) produced in a semiconductor layer is automatically restricted according to an incident X-ray amount, a dynamic range is not limited by saturation of the amount stored in the condenser, and a switching element is prevented from being subjected to withstand voltage break due to increase in voltage applied to the condenser.

According to the fourth aspect of the two-dimensional radiation detector of the invention, there can be obtained the two-dimensional radiation detector having a wide dynamic range wherein since a charge amount automatically restricted according to an incident X-ray amount is compensated, a picture image signal corresponding to the incident X-ray amount can be obtained; the condenser is prevented from being saturated; and the switching element is not subjected to a withstand voltage break.

While the invention has been explained with reference to the specific embodiments of the invention, the explanation is illustrative and the invention is limited only by the appended claims.

What is claimed is:

1. A two-dimensional radiation detector comprising:
a semiconductor layer having a bias electrode formed on one surface, and signal electrodes formed on a surface opposite to the bias electrode in a shape of matrix to form detection elements disposed two-dimensionally, said semiconductor layer converting an irradiated image to a picture image of charges,
switching elements arranged in a shape of matrix and connected to the signal electrodes, said switching elements scanning two-dimensionally said signal electrodes to read the charges stored in the semiconductor layer,
a bias power source connected to the bias electrode,
a switch situated between the bias power source and the bias electrode,
a current detecting device situated between the switch and the bias power source for detecting a current flowing through a circuit where the switch is interposed; and
a control circuit connected to the current detecting device for turning of f the switch when a current value detected by the detecting device reaches a threshold value.

2. A two-dimensional radiation detector as claimed in claim 1, further comprising a compensating device connected to the control circuit, wherein an output signal of each picture element is compensated to obtain a compensating signal Q by a following equation:

$$Q=(t1-t0)/(t2-t0)*q,$$

wherein t0 is an irradiation start time; t1 is an irradiation terminate time; t2 is a switch-off time when the switch in the control circuit is turned off; and q is an output signal of each picture element at the switch-off time t2, so that in case the irradiation is terminated before the time t1, an amount of the irradiation at the time t1 is calculated.

3. A two-dimensional radiation detector as claimed in claim 1, wherein said irradiated image includes a radiological image and a light image converted from the radiological image.

4. A two-dimensional radiation detector as claimed in claim 1, wherein said bias electrode is formed of a plurality of divided bias electrodes to provide clear images on the detection elements.

5. A two-dimensional radiation detector comprising:

a semiconductor layer having a bias electrode formed on one surface, and signal electrodes formed on a surface opposite to the bias electrode in a shape of matrix to form detection elements disposed two-dimensionally, said semiconductor layer converting an irradiated image to a picture image of charges, switching elements arranged in a shape of matrix and connected to the signal electrodes, said switching elements scanning two-dimensionally said signal electrodes to read charges stored in the semiconductor layer, a bias power source connected to the bias electrode, and an impedance element situated between the bias power source and the bias electrode of the semiconductor layer to reduce a voltage applied to the bias electrode when a large amount of irradiation is applied to the semiconductor layer.

6. A two-dimensional radiation detector as claimed in claim 5, further comprising a detecting device for detecting a drop of one of an electric current and a voltage flowing through said impedance element, and a compensating device connected to the detecting device for compensating a signal read out from each element based on a detected signal of the detecting device.

7. A two-dimensional radiation detector as claimed in claim 5, wherein said irradiated image includes a radiological image and a light image converted from the radiological image.

8. A two-dimensional radiation detector as claimed in claim 5, wherein said bias electrode is formed of a plurality of divided bias electrodes to provide clear images on the detection elements.

* * * * *